United States Patent [19]

Shiratori et al.

[11] Patent Number: 5,385,792
[45] Date of Patent: Jan. 31, 1995

[54] SOLID OXIDE FUEL CELL

[75] Inventors: Akira Shiratori; Hiroshi Takagi; Shozo Kobayashi, all of Nagaokakyo, Japan

[73] Assignee: Murata Manufacturing Co., Ltd., Kyoto, Japan

[21] Appl. No.: 67,559

[22] Filed: May 25, 1993

[30] Foreign Application Priority Data

May 28, 1992 [JP] Japan ................... 4-135470

[51] Int. Cl.6 ............................................. H01M 8/12
[52] U.S. Cl. ........................................ 429/32; 429/33; 429/36; 429/39
[58] Field of Search ..................... 429/32, 33, 35, 36, 429/39

[56] References Cited

U.S. PATENT DOCUMENTS

| | | | |
|---|---|---|---|
| 4,857,420 | 8/1989 | Maricle et al. | 429/32 X |
| 5,523,152 | 6/1991 | Akagi | 429/32 |
| 5,162,167 | 11/1992 | Minh et al. | 429/32 X |

FOREIGN PATENT DOCUMENTS

| | | |
|---|---|---|
| 424814 | 2/1991 | European Pat. Off. |
| 426265 | 8/1991 | European Pat. Off. |
| 9204740 | 3/1992 | European Pat. Off. |

OTHER PUBLICATIONS

Patent Abstracts of Japan, vol. 15, No. 265 (E-1086), 5 Jul. 1991 & JP-A-03 088273 (Tonen Corporation) 12 Apr. 1991.
6001 Chemical Abstracts, vol. 116, No. 18, 4 May 1992, Columbus, Ohio, US, Abstract No. 177737k.

*Primary Examiner*—Stephen Kalafut
*Attorney, Agent, or Firm*—Ostrolenk, Faber, Gerb & Soffen

[57] ABSTRACT

A solid oxide fuel cell which has a solid electrolyte having an air electrode and a fuel electrode on its upper surface and its lower surface respectively, an air distributor and a fuel distributor provided on the air electrode and the fuel electrode respectively, spacers disposed at both sides of the air distributor and the fuel distributor, an interconnector, and barrier films disposed between the spacers and the interconnector.

10 Claims, 2 Drawing Sheets

SOLID OXIDE FUEL CELL

BACKGROUND OF THE INVENTION

1. Field of the Invention

The present invention relates to a solid oxide fuel cell.

2. Description of Related Art

Conventionally, as the material of spacers of a solid oxide fuel cell, yttrium-stabilized zirconia (hereinafter referred to as YSZ) has been used because YSZ has high electrolytic conductivity and chemical stability. As the material of interconnectors, lanthanum chromate, or a compound of lanthanum chromate and an alloy, (e.g., those with calcium, etc.) have been used. Calcium is added so as to promote sintering of lanthanum chromate.

In, in order to enhance the efficiency of power generation of a solid oxide fuel cell, the internal impedance should be lowered. As a way off lowering the internal impedance, it is known that components such as electrolytes and interconnectors in the form of green sheets are laminated and sintered together. By this method, a thin solid oxide fuel cell can be made. In this method, it is required to control both the characteristic of fine particles of the material of each green sheet and the amount of binder to be added, such that the green sheets will shrink by sintering with the same shrinkage percentage. However, during sintering, chromium and calcium diffuse from an interconnector made of lanthanum chromate to a spacer made of YSZ. Accordingly, the shrinkage percentage and the sintering characteristic of the interconnector change, and warping and separation occur between the interconnector and the spacer.

SUMMARY OF THE INVENTION

It is an object of the present invention to provide a solid oxide fuel cell which has spacers and interconnectors which are joined together by sintering, without causing warping and separation.

In order to attain the object, a solid oxide fuel cell according to tile present invention has a barrier film between a fuel spacer and the adjacent interconnector, and another barrier film between an air spacer and the adjacent interconnector.

The fuel spacer and the air spacer are made of YSZ or the like. The interconnectors are made of lanthanum chromate, a material substituting an alkaline earth metal or a rare earth metal such as yttrium and strontium for the lanthanum of lanthanum chromate, a material substituting manganese, cobalt or the like for the chromium of lanthanum chromate, or the like. Calcium may be added to these materials so as to promote sintering.

The barrier films disposed between the fuel spacer and the interconnector, and between the air spacer and the interconnector, prevent diffusion of chromium and calcium from the interconnectors to both the fuel spacer. That is, the barrier films prevent a fall in the density of chromium and calcium in the interconnectors during sintering. Accordingly, the shrinkage percentage and the sintering characteristic of the interconnectors do not practically change.

Preferably, the air-side barrier film is made of lanthanum manganate, and the fuel-side barrier film is made of a mixture of nickel, zirconium oxide and lanthanum oxide.

BRIEF DESCRIPTION OF THE DRAWINGS

This and other objects and features of the present invention will be apparent from the following description with reference to the accompanying drawings in which.

DETAILED DESCRIPTION OF THE PREFERRED EMBODIMENTS

An exemplary solid oxide fuel cell according to the present invention is hereinafter described with reference to tile accompanying drawings.

Figure 1:
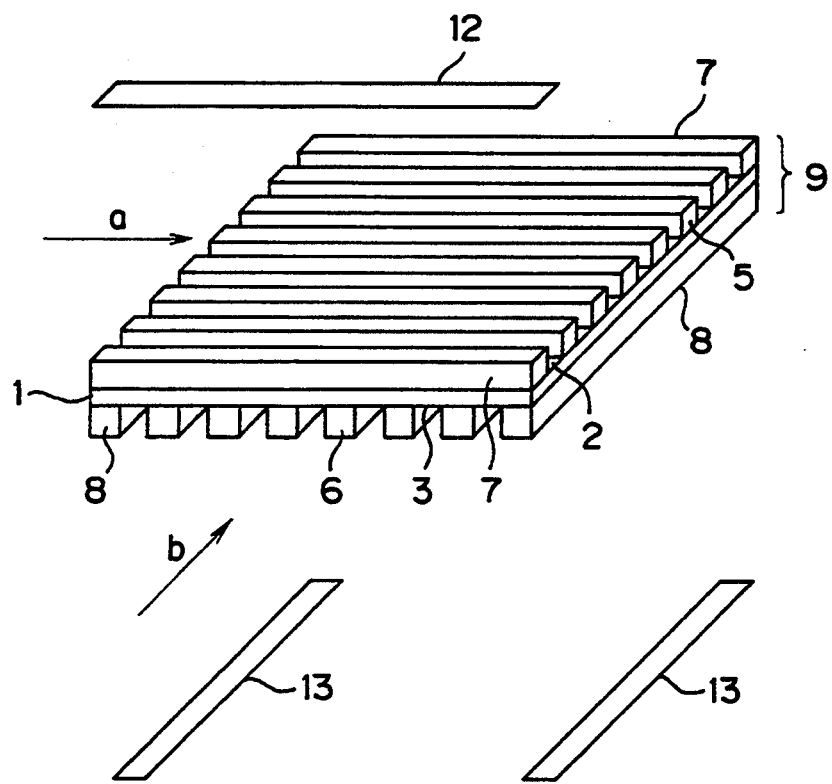
FIG. 1 is an exploded perspective view of a cell unit and interconnectors which form a solid oxide fuel cell according to the present invention.
Figure 2:
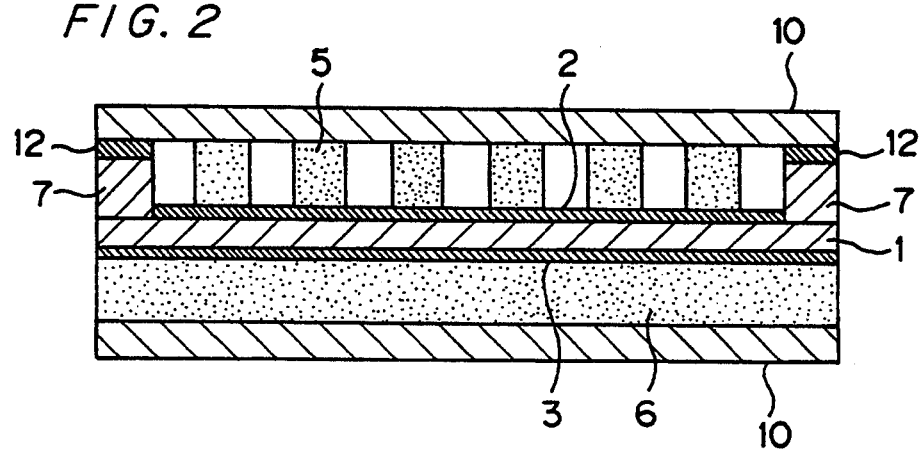
FIG. 2 is an elevational sectional view of the cell unit and the interconnectors, taken along the line II—II in FIG. 1.

A solid electrolyte 1 is rectangular in shape as shown in FIGS. 1 and 2, and is made of YSZ. More specifically, fine particles of YSZ are mixed with a binder (butyl alcoholic resin) and a solvent (toluene or ethanol), and are formed into a green sheet by the doctor blade method. An air electrode 2 and a fuel electrode 3 are provided on an upper surface and a lower surface of the solid electrolyte 1. The air electrode 2 and the fuel electrode 3 are spread entirely on the respective surfaces other than areas on which air spacers 7 and Fuel spacers 8 are disposed. The fuel electrode 3 is made of nickel oxide and YSZ. Powder of nickel oxide and YSZ, in the ratio of 6 to 4 are mixed with butyl alcoholic resin and a solvent (toluene or ethanol) and formed into a green sheet. The air electrode 2 is made of lanthanum manganate. Powder of lanthanum manganate is mixed with butyl alcoholic resin and a solvent (toluene or ethanol) and formed into a green sheet. A green sheet of air electrode 2 and a green sheet off Fuel electrode 3 are fixed on the respective surfaces of a green sheet of electrolyte 1 by thermocompression bonding.

Ribbed distributors 5 and 6 are disposed on the air electrode 2 and the fuel electrode 3, respectively. The air distributor 5, and the fuel distributor 6, distribute air and a fuel gas entirely and evenly to the air electrode 2, and the fuel electrode 3, respectively. Additionally, the air distributor 5; and the fuel distributor 6, are made of the same materials as the air electrode 2, and the fuel electrode 3 respectively, so that the distributors 5 and 6 will electrically connect the respective electrodes 2 and 3 is interconnectors 10. Green sheets of a mixture of nickel oxide and YSZ, in the ratio of 6 to 4, which are prepared in the above-described manner, are laminated and made into the ribbed fuel distributor 6. Green sheets of lanthanum manganate, which are prepared in the above-described manner, are laminated and made into the ribbed air distributor 5. These ribbed distributors 5 and 6 are fixed on the air electrode 2, and the fuel electrode 3, respectively.

The air spacers 7 are disposed at both sides of the air distributor 5 and isolate the internal air flow from the outside air. The fuel spacers 8 (FIG. 7) are disposed at both sides of the fuel distributor 6 and insolate the internal flow at fuel gas from the outside air. The spacers 7 and 8 are made of laminated green sheets prepared by mixing powder of YSZ with a solvent. The laminatetype spacers 7 and 8 are fixed on the respective surfaces of the solid electrolyte 1.

Air-side barrier films 12 are disposed on the air spacers 7, and fuel-side barrier films 13 are disposed on the fuel spacers 8. The air-side barrier films 12 are made o lanthanum manganate. Powder of lanthanum manganate is mixed with butyl alcoholic resin and a solvent (toluene or ethanol) and formed into a green sheet. The fuel-side barrier films 13 are made of nickel, zirconium oxide and lanthanum oxide. Powder of nickel, zirconium oxide and lanthanum oxide mixed with butyl alcoholic resin and a solvent (toluene or ethanol) and formed into a green sheet.

Further, green sheets of interconnectors 10 ace provided on the air distributor 5 and the air-side barrier films 12, and on the fuel distributor 6 and the fuel-side barrier films 13. The interconnectors 10 are made off $(La_{0.7}Ca_{0.3})Cr_3$ Powder of $(La_{0.7}Ca_{0.3})CrO_3$ is mixed with a solvent and formed into a green sheet.

Thus, the solid electrolyte 1 having the air trode 2 and the fuel electrode 3 on its upper and surfaces, the air distributor 5, the fuel distributor 6, the air spacers 7, the fuel spacers 8, the air-side barrier films 12 and the fuel-side barrier films 13, form a cell unit 9, and the interconnectors 10 are provided on an upper surface and a lower surface of the cell unit 9.

Figure 3:
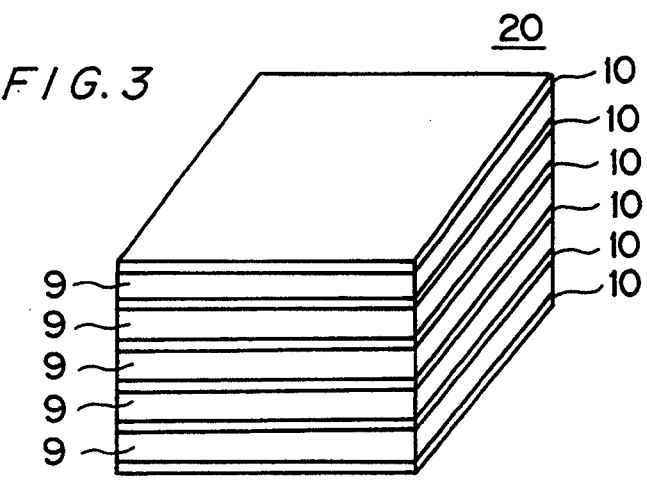
FIG. 3 is a perspective view of a solid oxide fuel cell according to the present invention.

Thus structured, five cell units 9 are laminated with interconnectors 10 in between. Then, the laminate is exposed to heat for degreasing. More specifically, the temperature around the laminate is raised to 400° C. at a rate of 0.1° C. minute, and the laminate is kept in the temperature of 400° C. for 2 hours. Thereafter, the temperature is raised to 1300° C., and the laminate is kept in the temperature of 1300° C. for 3 hours for sintering. Thus, a solid oxide fuel cell 20 as shown in FIG. 3 is produced. During the sintering, barrier films 12 and 13 prevent chromium and calcium, contained in the interconnectors 10, from diffusing to the spacers 7 and 8. Consequently, neither warping nor separation occurs between the interconnectors 10 and the spacers 7 and 8. By using the barrier films 12 and 13, a solid oxide cell which has a low internal impedance, that is, has a high efficiency of power generation, can be produced by the laminate sintering method.

The solid oxide fuel cell 20 generates electricity while it is placed in a high temperature (800° C.–1000° C.) and supplied both with air flowing in a direction indicated by arrow a in FIG. 1, and with a fuel gas, flowing in a direction indicated by arrow b in FIG. 1.

In the above embodiment, a rectangular solid oxide fuel cell has been described. However, the present invention is applicable to a disk-like solid oxide fuel cell as well.

Although the present invention has been described in connection with the preferred embodiment above, it is to noted that various changes and modifications are possible to those who are skilled in the art. Such changes and modifications are to be understood as being within the scope of the invention.

What is claimed is:

1. A solid oxide fuel cell unit comprising:
    a solid electrolyte having a fuel electrode on a first surface and an air electrode on a second surface;
    a conductive fuel distributor disposed on the fuel electrode;
    a conductive air distributor disposed on the air electrode;
    a fuel spacer and an air spacer which isolate reactive gases inside the fuel cell from outside air;
    a fuel-side barrier film disposed on the fuel spacer; and
    an air-side barrier film disposed on the air spacer;
    and an interconnector in contact with one of the conductive fuel distributor and conductive air distributor;
    wherein the barrier films prevent diffusion on calcium and chromium.

2. A solid oxide fuel cell unit as claimed in claim 1, wherein the air-side barrier film is made of lanthanum manganate, and the fuel-side barrier film is made of a mixture of nickel, zirconium oxide and lanthanum oxide.

3. A solid oxide fuel cell unit is claimed in claim 1, wherein the solid electrolyte, the air electrode, the fuel electrode, the air distributor, the fuel distributor, the air spacer, the fuel spacer, the air-side barrier film and the fuel-side barrier film are laminated and sintered together.

4. The solid oxide fuel cell unit as claimed in claim 1, wherein the interconnector is comprised of lanthanum chromate and the fuel spacer and air spacer are comprised of yttrium-stabilized zirconia.

5. A solid oxide fuel cell comprising a plurality of solid oxide fuel cell units, each of the solid oxide fuel cell units comprising:
    a solid electrolyte having a fuel electrode on a first surface and an air electrode on a second surface;
    a conductive fuel distributor disposed on the fuel electrode;
    a conductive air distributor disposed on the air electrode;
    a fuel spacer and an air spacer which isolate reactive gases inside the fuel cell from outside air;
    an interconnector between the conductive fuel distributor and conductive air distributor;
    a fuel-side barrier film between the fuel spacer and the interconnector; and
    an air-side barrier film between the air spacer and the interconnector;
    wherein the barrier films prevent diffusion of calcium and chromium.

6. A solid oxide fuel cell as claimed in claim 5, wherein the air-side barrier film is made of lanthanum manganate, and the fuel-side barrier film is made of a mixture of nickel, zirconium oxide and lanthanum oxide.

7. The solid oxide fuel cell as claimed in claim 5, wherein the plurality comprises five of the solid oxide fuel cell units.

8. A solid oxide fuel cell unit comprising:
    a solid electrolyte having a fuel electrode fixed on a first surface and an air electrode fixed on a second surface;
    conductive ribbed fuel distributing means fixed on the fuel electrode and conductive ribbed air distributing means fixed on the air electrode;
    spacing means fixed on the electrolyte for containing the fuel gas and air within the fuel cell; and
    diffusion barrier elements fixed on the spacing means to prevent diffusion of calcium and chromium from the spacing means to adjacent interconnecting means for connecting the fuel cell unit to other fuel cell units.

9. A solid oxide fuel cell unit as claimed in claim 8 wherein the interconnecting means is disposed on the spacing means.

10. A solid oxide fuel cell unit as claimed in claim 8, wherein the diffusion barrier means comprises a film made of lanthanum manganate or a mixture of nickel, zirconium oxide and lanthanum oxide.

* * * * *